UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

SEPARATION OF ORGANIC COMPOUNDS AT LOW TEMPERATURES.

1,087,961.  Specification of Letters Patent.  Patented Feb. 24, 1914.

No Drawing.  Application filed October 11, 1912. Serial No. 725,162.

*To all whom it may concern:*

Be it known that I, WALTER E. MASLAND, of Wilmington, in the county of Newcastle and in the State of Delaware, have invented a certain new and useful Improvement in the Separation of Organic Compounds at Low Temperatures, and do hereby declare that the following is a full, clear, and exact description thereof.
My invention relates particularly to the separation of olefins, though it may be used to separate mixtures of other organic compounds. Among other compounds to which my invention may be applied are the ring hydrocarbons or derivatives thereof.

The object of my invention is to provide a process for the separation of olefins and other organic compounds in an economical manner, but to also provide a process for the production of alcohols and acetic esters.

Mixtures of olefins often contain constituents which will react very differently with reagents. This is especially true of such olefins as pentylenes and hexylenes, which have been obtained by the treatment of pentanes and hexanes by chlorination to produce monochlorhydrocarbons, and where these monochlorhydrocarbons have been subjected to acetylation. The acetylation produces as a by-product, a mixture of olefins, the several constituents of which behave very differently toward reagents.

One of the objects of my invention is to separate such compounds, and particularly olefins, without having recourse to high temperatures. Inasmuch as the method of separation involves preferably the use of hydrochloric acid and, in some cases, strong hydrochloric acid, disadvantageous results have occurred in the use of preceding processes by reason of the high temperatures involved and the consequent corrosion of the vessels. By using my process, the high temperatures may be entirely avoided, and there is, consequently, no occasion to use expensive vessels such, for example, as those made of platinum or silver, to avoid corrosion by the action of the strong hydrochloric acid at the high temperatures previously used.
My invention is an improvement upon the process described and claimed in my application for Letters Patent of the United States entitled "Separation of organic compounds," and executed on even date herewith.

While my invention may be applied to the separation of many different organic compounds, as indicated above, I will describe my invention as applied to the separation of the olefins obtained as above.

The mixture of amylenes and hexylenes is allowed to stand or agitated with (the latter requiring a shorter length of time) strong hydrochloric acid, that is, ordinary concentrated acid of commerce, or relatively dilute hydrochloric acid. It should be noted in this connection that in this step of the process, acid of practically any concentration can be used, since very dilute hydrochloric acid will react to a certain extent with the production of chlorhydrocarbons, although in a commercial process this reaction may be too slow to be of considerable practical value. The reaction is effected at ordinary temperatures. The olefins in part combine with the hydrochloric acid to form chlorhydrocarbons of the paraffin series, the hydrocarbon amylene reacting in the following manner:

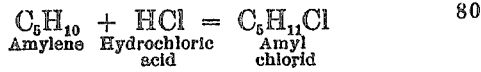
$$C_5H_{10} + HCl = C_5H_{11}Cl$$
Amylene  Hydrochloric  Amyl
acid  chlorid

After the olefins have reacted with the hydrochloric acid to form chlorhydrocarbons of the paraffin series, as already described in the application, the oily layer obtained is separated from the spent acid and distilled. The unchanged olefins obtained as a distillate are then subjected to the action of concentrated hydrochloric acid and calcium chlorid or other dehydrating agent at ordinary temperatures. The olefins thus treated become changed into chlorhydrocarbons which react differently from the chlorhydrocarbons obtained in the first stage of the process. The term concentrated sufficiently describes the strength of this acid. By reason of the presence of the calcium chlorid the acid is more concentrated than the acid used in the first treatment with hydrochloric acid described above.

Owing to the fact that in the second stage of this process olefins are treated with a mixture of concentrated hydrochloric acid and calcium chlorid which is much more reactive than concentrated hydrochloric acid alone, there remains after this treatment a mixture of hydrochloric acid and calcium chlorid which may be utilized in place of the strong or relatively dilute acid mentioned for the use in the first process, it being understood that the strength of this acid has been reduced sufficiently in this operation so that it is satisfactory for the first step in the process. On the other hand since this residual acid contains calcium chlorid it is more reactive than ordinary dilute hydrochloric acid, and for this reason it may be employed in the first stage in the process even when the strength of the acid as expressed in per cent. of HCl has fallen considerably below that of ordinary dilute hydrochloric acid, the strength of which is also expressed in the terms of per cent. of HCl. It may be seen in this way that if desirable it is unnecessary to discard as useless in the process any hydrochloric acid and calcium chlorid mixture, as the same may always be employed, if found desirable, in the first step in the process as long as it contains any appreciable quantity of hydrochloric acid. It should also be noted in connection with the second stage of the process, in which concentrated hydrochloric acid and calcium chlorid are used, that the acid mixture remaining after such a treatment may be of sufficient strength to be used over again in a similar treatment before it becomes weakened to such an extent that it is valuable only for use in the first step of the process.

In regard to the length of time required for the reaction this may vary considerably since the degree of conversion into chlorhydrocarbons obtained in each treatment, depends to a great extent on the duration of the treatment. It has been found advantageous however, to continue the agitation of the mixture for from 12 to 24 hours in each case, although it may readily be understood that the operation may be carried on for a shorter or longer period as desired.

In regard to the quantities of reagents employed, obviously the same statement holds true, as the quantity of reagent employed merely affects the degree of conversion. I have found it advantageous however, to use with one part of the olefin mixture from two to four parts of the acid and from one to three parts of the calcium chlorid.

With regard to the temperature of distillation it should be noted that this depends entirely on the olefins employed, but in the case of a mixture of amylenes and hexylenes the temperatures of distillation would range from about 25° to about 80° C. Obviously the temperature at which the distillation is interrupted merely affects the degree of separation of the unchanged olefins from the chlorhydrocarbons and in order to obtain the most satisfactory separation a maximum temperature of about 75° to 80° C. is the most satisfactory in this particular case.

The chlorhydrocarbons thus obtained may be, as indicated, utilized in any manner found desirable, but the chlorhydrocarbons obtained by treatment with hydrochloric acid of low concentration, are well adapted for the production of monohydric alcohols, while the other chlorhydrocarbons are adapted for the production of acetates, as by the process of acetylation with acetic acid and sodium or potassium acetate. These former chlorhydrocarbons, if treated in the same manner as the chlorhydrocarbons obtained in the latter stage of the process, would be broken down again into olefins.

The method of obtaining alcohols from certain of the chlorhydrocarbons is covered by a co-pending patent application of mine, Serial No. 725,163.

The treatment of these mixed olefins without separation, in order to produce alcohols and acetates, would evidently result in poor yields, and would, consequently, be an expensive operation, while after the olefins have been separated in accordance with my process, the alcohols may be obtained from certain of the chlorhydrocarbons and acetates from others with very high yields. The action with the strong hydrochloric acid being carried out at a low temperature, avoids the necessity of using expensive apparatus and avoids the need of supplying a great amount of heat for high temperatures.

While I have described my invention above in detail, I wish it to be understood that many changes may be made therein without departing from the spirit of my invention. Furthermore, it is to be understood that wherever I have used the term "low concentration" herein, I mean thereby merely a concentration which is low as compared with the concentration used in the latter stage of the process. Furthermore, the concentration used in the latter stage of the process may be obtained by the use of any dehydrating agent found to be desirable, and that wherever I have made reference to the use of calcium chlorid, I contemplate the use instead of any other desired dehydrating agent.

I claim:

1. The process which comprises separating isomeric aliphatic hydrocarbons by treating them with a solution of a reagent capable of acting upon only some of the isomers first at a low concentration, separating out the portion acted upon and then treating the unchanged remaining portion with a solution of the reagent at a higher concentration to act upon other isomers.

2. The process which comprises separating isomeric aliphatic unsaturated hydrocarbons by treating them with a solution of a reagent capable of acting upon only some of the isomers first at a low concentration, separating out the portion acted upon and then treating the unchanged remaining portion with a solution of the reagent at a higher concentration to act upon other isomers.

3. The process which comprises separating isomeric olefins by treating them with a solution of a reagent capable of acting upon only some of the isomers first at a low concentration, separating out the portion acted upon and then treating the unchanged remaining portion with a solution of the reagent at a higher concentration.

4. The process which comprises separating isomeric aliphatic hydrocarbons by treating them with hydrochloric acid first at a low concentration, separating out the portion acted upon and then treating the unchanged remaining portion with hydrochloric acid at a higher concentration.

5. The process which comprises separating isomeric aliphatic unsaturated hydrocarbons by treating them with hydrochloric acid first at a low concentration, separating out the portion acted upon and then treating the unchanged remaining portion with hydrochloric acid at a higher concentration.

6. The process which comprises separating isomeric olefins by treating them with hydrochloric acid first at a low concentration, separating out the portion acted upon and then treating the unchanged remaining portion with hydrochloric acid at a higher concentration.

7. The process which comprises separating isomeric aliphatic hydrocarbons by treating them with a solution of a reagent capable of acting upon only some of the isomers first at a low concentration, separating out by distillation the portion acted upon, and then treating the unchanged remaining portion with a solution of the reagent at a higher concentration to act upon other isomers.

8. The process which comprises separating isomeric aliphatic unsaturated hydrocarbons by treating them with a reagent capable of acting upon only some of the isomers first at a low concentration, separating out by distillation the portion acted upon, and then treating the unchanged remaining portion with the reagent at a higher concentration to act upon other isomers.

9. The process which comprises separating olefins by treating them with a solution of a reagent capable of acting upon only some of the isomers first at a low concentration, separating out by distillation the portion acted upon, and then treating the unchanged remaining portion with a solution of the reagent at a higher concentration to act upon other isomers.

10. The process which comprises separating isomeric aliphatic hydrocarbons by treating them with hydrochloric acid first at a low concentration, separating out by distillation the portion acted upon, and then treating the unchanged remaining portion with hydrochloric acid at a higher concentration.

11. The process which comprises separating isomeric aliphatic unsaturated hydrocarbons by treating them with hydrochloric acid first at a low concentration, separating out by distillation the portion acted upon, and then treating the unchanged remaining portion with hydrochloric acid at a higher concentration.

12. The process which comprises separating isomeric olefins by treating them with hydrochloric acid first at a low concentration, separating out by distillation the portion acted upon and then treating the unchanged remaining portion with hydrochloric acid at a higher concentration.

13. The process which comprises separating isomeric pentylenes and hexylenes by treating them with a solution of a reagent capable of acting upon only some of the isomers first at a low concentration, separating out the portion acted upon, and then treating the unchanged remaining portion with a solution of the reagent at a higher concentration to act upon other isomers.

14. The process which comprises separating isomeric pentylenes and hexylenes by treating them with hydrochloric acid first at a low concentration, separating out the portion acted upon and then treating the unchanged remaining portion with hydrochloric acid at a higher concentration.

15. The process which comprises separating isomeric pentylenes and hexylenes by treating them with a solution of a reagent capable of acting upon only some of the isomers first at a low concentration, separating out by distillation the portion acted upon, and then treating the unchanged remaining portion with a solution of the reagent at a higher concentration to act upon other isomers.

16. The process which comprises separating isomeric pentylenes and hexylenes by treating them with hydrochloric acid first at a low concentration, separating out by distillation the portion acted upon and then treating the unchanged remaining portion with hydrochloric acid at a higher concentration.

17. The process which comprises separating isomeric aliphatic hydrocarbons by treating them with hydrochloric acid first at a low concentration, separating out the portion acted upon and then treating the unchanged remaining portion with hydrochloric acid at a higher concentration in the presence of calcium chlorid.

18. The process which comprises separating isomeric aliphatic unsaturated hydrocarbons by treating them with hydrochloric acid first at a low concentration, separating out the portion acted upon and then treating the unchanged remaining portion with hydrochloric acid at a higher concentration in the presence of calcium chlorid.

19. The process which comprises separating isomeric olefins by treating them with hydrochloric acid first at a low concentration, separating out the portion acted upon, and then treating the unchanged remaining portion with hydrochloric acid at a higher concentration in the presence of calcium chlorid.

20. The process which comprises separating isomeric aliphatic hydrocarbons by treating them with hydrochloric acid first at a low concentration, separating out by distillation the portion acted upon, and then treating the unchanged remaining portion with hydrochloric acid at a higher concentration in the presence of calcium chlorid.

21. The process which comprises separating isomeric aliphatic unsaturated hydrocarbons by treating them with hydrochloric acid first at a low concentration, separating out by distillation the portion acted upon, and then treating the unchanged remaining portion with hydrochloric acid at a higher concentration in the presence of calcium chlorid.

22. The process which comprises separating isomeric olefins by treating them with hydrochloric acid first at a low concentration, separating out by distillation the portion acted upon and then treating the unchanged remaining portion with hydrochloric acid at a higher concentration in the presence of calcium chlorid.

23. The process which comprises separating isomeric aliphatic hydrocarbons by treating them with hydrochloric acid first at a low concentration, separating out the portion acted upon, then treating the unchanged remaining portion with hydrochloric acid at a higher concentration in the presence of calcium chlorid, and utilizing the spent acid in the low concentration treatment.

24. The process which comprises separating siomeric pentylenes and hexylenes by treating them with hydrochloric acid first at a low concentration at ordinary temperatures, separating out the portion acted upon and then treating the unchanged remaining portion with hydrochloric acid at a higher concentration, at ordinary temperatures.

25. The process which comprises separating isomeric pentylenes and hexylenes by treating them with hydrochloric acid first at a low concentration at ordinary temperatures, separating out by distillation the portion acted upon and then treating the unchanged remaining portion with hydrochloric acid at a higher concentration at ordinary temperatures.

In testimony that I claim the foregoing I have hereunto set my hand.

WALTER E. MASLAND.

Witnesses:
C. R. Mudge,
A. M. Gorman.